A. E. JERRAM.
FEATHER EDGING MACHINE.
APPLICATION FILED DEC. 27, 1910.
1,115,074.
Patented Oct. 27, 1914.
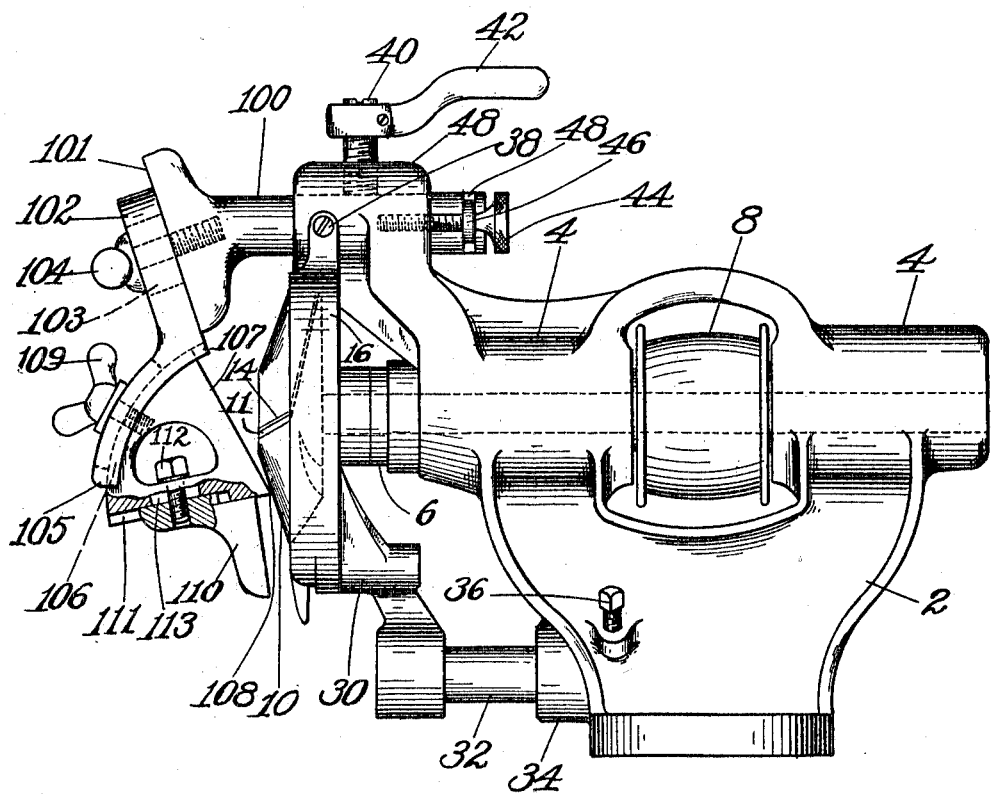
WITNESSES.
Elizabeth C. Coupe
A. Blanche Hargraves.
INVENTOR.
Arthur E. Jerram
By his Attorney,
Nelson W. Howard

UNITED STATES PATENT OFFICE.

ARTHUR ERNEST JERRAM, OF LEICESTER, ENGLAND, ASSIGNOR TO UNITED SHOE MACHINERY COMPANY, OF PATERSON, NEW JERSEY, A CORPORATION OF NEW JERSEY.

FEATHER-EDGING MACHINE.

1,115,074.   Specification of Letters Patent.   Patented Oct. 27, 1914.

Application filed December 27, 1910. Serial No. 599,508.

*To all whom it may concern:*

Be it known that I, ARTHUR E. JERRAM, a subject of the King of England, residing at Leicester, Leicestershire, England, have invented certain Improvements in Feather-Edging Machines, of which the following description, in connection with the accompanying drawings, is a specification, like reference characters on the drawings indicating like parts in the several figures.

This invention relates to feather-edging machines which are used for fleshing or beveling the faces of shoe soles and more particularly to machines in which a rotary cutter is employed. In machines of this class an edge gage and a face guide are employed to regulate the width and the depth of the cut; and these members have been so mounted with respect to the cutter head that somewhat complicated adjustments have been necessary.

Accordingly, one feature of this invention relates to the provision of means whereby certain of these adjustments are simplified and others rendered unnecessary. This and other features of the invention including certain details of construction and combinations of parts will be described in connection with an illustrative machine and pointed out in the appended claims.

Referring now to the accompanying drawing, the figure is a side elevation of a machine in which the present invention is embodied.

Mounted in the frame 4 is a shaft carrying a driving pulley 8 to which power may be applied from any convenient source, and held fast on the outer end of the shaft is a cutter head 10. This cutter head is frusto conical as shown and is provided with a plurality of knives 11 which extend through its outer face in the manner in which the blade of a wood plane extends through its block. The blades 11, however, as well as the slots 14, through which they pass, extend in directions which are oblique to the elements of the head. A guard 16 is mounted upon a bracket 30 which in turn is mounted upon a stud 32 adjustably held in a boss 34 by a screw bolt 36; and the angular adjustment of the guard may be facilitated by an adjusting screw 38.

The support for the work controlling devices is a stud 100 which is held in a split bearing in the frame of the machine by a screw 40 which may be turned by the handle 42; and in order to facilitate longitudinal adjustment of the stud an adjusting screw 44 having a fixed collar 46 which enters a groove 48 in the stud 100 is threaded into the frame. The outer end of the stud 100 is enlarged, and this enlargement is provided with a face 101 the plane of which is parallel to the edge of each knife 11 as it comes into operative position. A carrier 102 is adjustably clamped against this face 101 by means of a thumb screw 104 the stem of which passes through a slot 103 in the carrier and is threaded into the enlargement. The lower portion 105 of the carrier is segmental in form and is provided with a segmental groove 106 which receives the correspondingly shaped end of an edge gage 107. This edge gage has the outline of a sector of a circle the center of which lies at the point 108 so that angular adjustment of the edge gage in the groove 106 will not change the position of said point. The edge gage is held in adjusted position by means of a thumb screw 109, the stem of which passes through a slot in the segmental portion of the carrier and is threaded into the edge gage. The lower side of the edge gage is provided with a groove 111 and with an opening near the center of said gage. A face guide 110 is slidably mounted in said groove and is held in adjusted position by a screw bolt 112, the head of which is received in the opening and the stem of which passes through a slot 113 and is threaded into the face guide.

In the operation of the machine a portion of the margin of a sole is received between the face guide 110 and the adjacent face of the cutter with its edge resting against the operative portion of the edge gage 107, and as the sole is turned and fed forward, the margin is fleshed or beveled according to the angular position of the face guide 110. In order to vary the width of the cut the screw 104 is loosened and the carrier adjusted along the face 101; in order to vary the depth of the cut the screw bolt 112 is loosened and the face guide adjusted along the edge gage 107; and in order to vary the angle of the cut, the thumb screw 109 is loosened and the edge gage together with the face guide adjusted angularly about an axis passing through the point 108. It should be noted that the parts are so constructed and arranged that the operative portion of the edge gage is maintained adjacent the cutter irrespective of the adjustments described above so that it is never necessary, after the support 100 has once been adjusted, to move the edge gage toward or from the cutter as has formerly been the case.

The invention having been thus described, what is claimed and desired to be secured by Letters Patent of the United States is:—

1. A feather edging machine having a cutter and means for actuating said cutter, in combination with work controlling devices comprising an edge gage provided with an operative portion terminating in an apex adjacent the cutter, said gage being adjustable about an axis passing through said apex.

2. A feather edging machine having a cutter and means for actuating said cutter, in combination with work controlling devices comprising an edge gage provided with an operative portion terminating in an apex adjacent the cutter, said gage being adjustable about an axis passing through said apex, and means for adjusting said apex toward and from the cutter.

3. A feather edging machine having a cutter and means for actuating said cutter, in combination with work controlling devices comprising an edge gage provided with an operative portion terminating in an apex adjacent the cutter, said gage being adjustable about an axis passing through said apex, and means for adjusting said apex in a direction parallel to the edges of the blades of the cutter as they come into operative position.

4. A feather edging machine having a cutter and means for actuating said cutter, in combination with work controlling devices comprising an edge gage provided with an operative portion terminating in an apex adjacent the cutter, said gage being adjustable about an axis passing through said apex, means for adjusting said apex toward and from the cutter and means for adjusting said apex in a direction parallel to the adjacent surface of the cutter.

5. A feather edging machine having a cutter and means for actuating said cutter in combination with work controlling devices comprising a face guide, an edge gage by which said guide is carried, and means for adjusting the face guide in different angular positions with respect to the cutter while maintaining in all positions of said guide the operative relation of said gage to said cutter.

6. A feather edging machine having a cutter and means for actuating said cutter in combination with work controlling devices comprising a face guide, an edge gage by which said guide is carried, and means for adjusting the face guide in different angular positions with respect to the cutter while maintaining the distance from the operative portion of said gage to said cutter constant.

7. A feather edging machine having a cutter and means for actuating said cutter in combination with work controlling devices for supporting the work at different angles and a carrier for the work controlling devices, said carrier being adjustable in a single direction parallel to the edges of the knives of the cutter as they come into operative position.

8. A feather edging machine having a cutter and means for actuating said cutter in combination with work controlling devices comprising a carrier, an edge gage carried thereby angularly adjustable about an axis which is adjacent the cutter, and a face guide carried by the edge gage and adjustable with respect thereto, said axis being located nearer to said cutter than is said face guide.

9. A feather edging machine having a cutter and means for actuating said cutter in combination with a support having a guiding portion lying in a plane which is parallel with the edges of the blades of the cutter as they come into operative position, and work controlling devices comprising a carrier adjustably held with respect to said guiding portion, an edge gage adjustable with respect to said carrier about an axis lying in the operative portion of said gage, and a face guide adjustable with respect to said gage.

10. A feather edging machine having a rotary frusto conical cutter head provided with projecting knives arranged with their edges oblique to the elements of said head in combination with work controlling devices comprising an edge gage provided with an operative portion terminating in an apex, and means for adjusting said gage about an axis passing through said apex.

In testimony whereof I have signed my name to this specification in the presence of two subscribing witnesses.

ARTHUR ERNEST JERRAM.

Witnesses:
 ELEANOR PYWELL,
 KATHERINE PEXTON.

Copies of this patent may be obtained for five cents each, by addressing the "Commissioner of Patents, Washington, D. C."